(12) United States Patent
Wiederin

(10) Patent No.: US 8,374,960 B2
(45) Date of Patent: Feb. 12, 2013

(54) PREPAID TRANSACTION TRACKING

(75) Inventor: Shawn E Wiederin, Cedar Rapids, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 609 days.

(21) Appl. No.: 10/282,159

(22) Filed: Oct. 29, 2002

(65) Prior Publication Data

US 2004/0083172 A1 Apr. 29, 2004

(51) Int. Cl.
*G06Q 40/00* (2006.01)

(52) U.S. Cl. ............................ 705/41; 705/30

(58) Field of Classification Search .............. 705/10–44; 707/10–44
See application file for complete search history.

(56) References Cited

U.S. PATENT DOCUMENTS

| | | | | |
|---|---|---|---|---|
| 4,766,293 A * | 8/1988 | Boston | ............................ | 705/41 |
| 5,526,428 A * | 6/1996 | Arnold | ............................ | 713/159 |
| 5,708,422 A * | 1/1998 | Blonder et al. | ............... | 340/5.41 |
| 6,000,832 A * | 12/1999 | Franklin et al. | ............... | 700/232 |
| 6,128,602 A * | 10/2000 | Northington et al. | ........... | 705/35 |
| 6,216,115 B1 * | 4/2001 | Barrameda et al. | ............. | 705/40 |
| 6,226,364 B1 * | 5/2001 | O'Neil | ........................ | 379/114.2 |
| 6,233,604 B1 * | 5/2001 | Van Horne et al. | ............ | 709/203 |
| 6,236,851 B1 * | 5/2001 | Fougnies et al. | ............... | 455/408 |
| 6,253,081 B1 * | 6/2001 | Koster | .......................... | 455/433 |
| 6,625,438 B2 * | 9/2003 | Hanson | ........................ | 455/405 |
| 7,825,585 B2 * | 11/2010 | Suh et al. | ...................... | 313/504 |
| 7,941,367 B2 * | 5/2011 | Bishop et al. | ................... | 705/38 |
| 7,962,406 B2 * | 6/2011 | Bishop et al. | ................... | 705/39 |
| 7,979,349 B2 * | 7/2011 | Bishop et al. | ................... | 705/39 |
| 8,103,584 B2 * | 1/2012 | Bishop et al. | ................... | 705/39 |
| 8,234,212 B2 * | 7/2012 | Bishop et al. | ................... | 705/39 |
| 2002/0010660 A1 | 1/2002 | Nakamura et al. | | |
| 2009/0164330 A1 * | 6/2009 | Bishop et al. | ................... | 705/19 |
| 2010/0299195 A1 * | 11/2010 | Nix et al. | ................... | 705/14.17 |

FOREIGN PATENT DOCUMENTS

| | | |
|---|---|---|
| FR | 2740581 | 4/1997 |
| WO | 01/77933 | 10/2001 |

* cited by examiner

*Primary Examiner* — Frantzy Poinvil

(57) ABSTRACT

The prepaid transaction tracking system allows, for example, entities, such as businesses, individuals, or the like, to have the ability to identify, track and maintain information about prepaid transactions.

23 Claims, 5 Drawing Sheets

| Profile | | |
|---|---|---|
| Travel | Dining | Telephone |
| Date | Restaurant Name | Calling No. |
| From | Restaurant Address | Called No. |
| To | Date/Time | Duration |
| Type (air, taxi, etc) | Amount | Time of Call |
| Client | Tip | Peak/Off Peak |
| Amount | Tax Deductible | Total Charges |
| Carrier | Client Expense | |
| | No. of People | |
| | | |
| | | |
| | | |
| | | |

PREPAID TRANSACTION TRACKING

BACKGROUND OF THE INVENTION

1. Field of the Invention

This invention generally relates to the tracking of information, and more particularly, to providing systems and methods that enable the tracking of prepaid transactions.

2. Description of Related Art

Prepaid transaction systems are typically based on a prepaid card, such as a calling card. This card is purchased with a predetermined amount of credit against which the users can debit various purchasing activities, such as making a call, for example, a long distance call. Typically these cards are available at convenience stores, and are purchased with cash. A user may then use the card without the necessity of carrying, for example, exact change for a pay phone.

The card can be disposable, such as a one time use card, or, alternatively, "recharged" by taking the card to a predetermined location to have credit placed back on the card. For example, a number of public transportations systems employ a reusable card that is recharged on a dedicated card crediting machine.

SUMMARY

While the above systems are convenient, and provide security for a user in that they do not need to carry cash or exact change, it is difficult to track transactions that are associated with the prepaid card. For example, businesses, individuals or other entities may need the ability of identifying and/or tracking purchase information associated with the prepaid transaction for tax purposes, business purposes, proof of cost, proof of purchase, time accounting, expense reimbursement, accounting, or the like.

An exemplary embodiment of the prepaid transaction tracking system allows entities, such as a small businesses, individuals, or the like, to have the ability to identify, track and maintain information about prepaid transactions.

For example, and in accordance with an exemplary embodiment of this invention directed toward prepaid calling cards, a calling card user purchases a prepaid calling card. Then, for example, at the time of purchase, or upon first use of the card, the calling card, or more specifically, for example, an identifier on the calling card, is associated with a profile stored on a server. Therefore, every time a call is made, the server records billing information associated with the call such as the time and date of call, the length of the call, the originating phone number of the call, the terminating number of the call, or any other information relevant to the transaction. The billing information associated with the call is then stored on the server which can be accessed by, for example, an accountant at the users company.

Furthermore, the server can be sophisticated and not only record static information such as the originating telephone number and the destination telephone number, but can interact with other systems to allow, for example, the obtaining of the name, address, or other information associated with both of the telephone numbers. Therefore, for example, when a report is produced that itemizes one or more transactions that occurred with the calling card, all pertinent information can appear in the report.

While the above exemplary embodiment is discussed in relation to a telephone calling card, it should also be appreciated that the concepts of this invention can be expanded to include any type of prepaid or postpaid transaction system, including prepaid calling cards, postpaid calling cards, public transportation vouchers, online or offline gift certificates, prepaid credit or debit cards, stored value cards, credit cards, person-to-person payment cards, or the like. In general, the systems and methods of this invention can be used to track any type of transaction.

Aspects of the present invention relate to tracking transaction data. In particular, the systems and methods of this invention allow the tracking of prepaid or postpaid transaction information.

Aspects of the present invention also relate to generating reports based on prepaid transaction tracking information.

Aspects of the present invention further relate to providing an interface for a user to access prepaid transaction tracking information.

Aspects of the present invention additionally relate to a calling card transaction tracking system.

Aspects of the present invention further relate to providing summary information regarding transaction information associated with one or more calling cards.

These and other features and advantages of this invention are described in or are apparent from the following detailed description of the embodiments.

BRIEF DESCRIPTION OF THE DRAWINGS

The embodiments of the invention will be described in detail, with reference to the following figures wherein:

FIG. 2 is an exemplary profile according to this invention;

DETAILED DESCRIPTION

The systems and methods of this invention allow information associated with prepaid transactions to be stored, optionally supplemented, and retrieved for subsequent use. In particular, and in accordance with an exemplary embodiment of this invention, a user, via an interface, associates a prepaid card with a profile stored in a prepaid account module. Thereafter, anytime the prepaid card is used for a transaction, information about that transaction can be recorded and stored.

While the exemplary embodiments illustrated herein show the various components of the prepaid transaction tracking system collocated, it is to be appreciated that the various components of the prepaid transaction tracking system can be located at distant portions of a distributed network, such as a local area network, a wide area network, a telecommunications network, an intranet and/or the Internet, or within a dedicated prepaid transaction tracking system. Thus, it should be appreciated that the components of the prepaid transaction tracking system can be combined into one or more devices or collocated on a particular node of a distributed network, such as a telecommunications network. As will be appreciated from the following description, and for reasons of computational efficiency, the components of the prepaid transaction tracking system can be arranged at any location within a distributed network without affecting the operation of the system.

Furthermore, it should be appreciated that the various links connecting the elements can be wired or wireless links, or a combination thereof, or any other known or later developed element(s) that is capable of supplying and/or communicating data to and from the connected elements.

Additionally, it should be appreciated that while various functional components are illustrated, various other components such as switches, routers, long distance carriers, other types of networks, account reconciliation systems, or the like, can also be included and work in conjunction with the prepaid transaction tracking system. Also, while the systems and methods of this invention will be described in relation to specific embodiments, it is to be appreciated that the systems and methods can be applied with equal success over other types of communications standards and protocols such as voice-over packet, Voice-Over IP (VOIP), voice-over network, wired or wireless communications systems, such as cellular phones, PDA's, or the like. In general, the systems and methods of this invention will work equally well with any communication system or protocol where a user interfaces with a prepaid transaction interface that further communicates with at least a tracking system.

Figure 1:
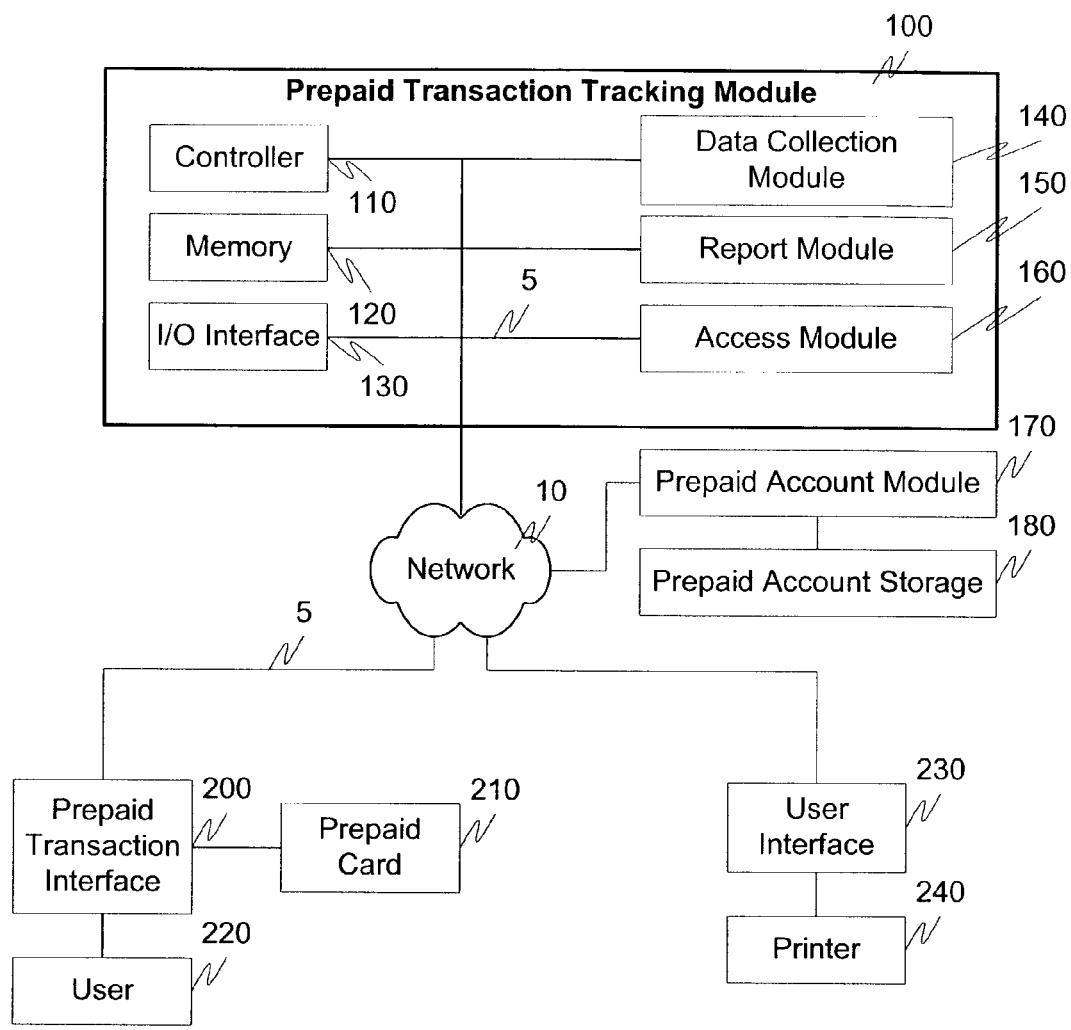
FIG. 1 is a functional block diagram illustrating an exemplary prepaid transaction tracking system according to this invention.

FIG. 1 illustrates a first exemplary embodiment of a prepaid transaction tracking system 1 according to this invention. In particular, the prepaid transaction tracking system 1 comprises a prepaid transaction tracking module 100, a network 10, a prepaid transaction interface 200, a prepaid card 210, a user interface 230, a printer 240, a prepaid account module 170 and a prepaid account storage 180, all interconnected by links 5.

The prepaid transaction tracking module 100 further comprises a controller 110, a memory 120, an I/O interface 130, a data collection module 140, a report module 150 and an access module 160, again all interconnected by links 5.

The exemplary systems and methods of this invention will be described in relation to a specific prepaid transaction system. However, to avoid unnecessarily obscuring the present invention, the following description omits well-known structures and devices that may be shown in block diagram form or otherwise summarized. For purposes of explanation, numerous specific details are set forth in order to provide a thorough understanding of the present invention. In should be appreciated however that the present invention may be practiced in a variety of ways beyond these specific details. For example, the systems and methods of this invention can generally be applied to any type of prepaid transaction.

Additionally, the term module as used herein denotes any piece of hardware, software, or combination thereof, that is capable of performing the functions associated with that element.

In operation, a user 220 possessing a prepaid card 210 associates the card with the prepaid transaction interface 200. However, it is to be appreciated that the prepaid card 210 is not limited a card, but in general can be any device that is capable of maintaining prepaid transaction information, such as credit information. Thus, for example, either upon initially purchasing of the card, first use of the card, recharging of the card, or any other time deemed appropriate, the prepaid transaction tracking system 1 associates the prepaid card 210 with one or more profiles managed by the prepaid account module 170 and stored on the prepaid account storage 180.

In particular, if the user associates the prepaid card 210 with a profile on the prepaid account module 170 upon purchasing the card, the user can select from one or more predetermined profiles on the prepaid account module 170 that, for example, identify a company the individual may work for. For example, the profile can be based on a "company template" of profiles or a meta-profile that defines specific aspects of the profile. Alternatively, the user, upon presenting the prepaid card 210 to, for example, the prepaid transaction interface 200 or a card purchasing machine (not shown), can create a profile that, for example, identifies specific transactions that are to be tracked, identifies one or more recipients of the information tracked by the prepaid transaction module 100, selects reporting options, or the like. In general, the user 220, or alternatively other users (not shown), such as an administrator at a company, or the like, can also establish profiles and store them on the prepaid account module 170. Then, upon the user presenting the prepaid card 210 to the prepaid transaction interface 200, the user can specify to which profile the transaction(s) associated with the presented prepaid card 210 is to be associated. Additionally, the profile can dynamically specify the types of information that are to be tracked. For example, specific information can be selectively tracked if the purchase is for a gas purchase, while other information can be tracked for a meal purchase, or the like.

Alternatively, the features of establishing a profile, modifying and/or updated a profile can be performed when a user 220 first presents the prepaid card 210 to the prepaid transaction interface to conduct a transaction. Likewise, a user 220 can modify, with the cooperation of the prepaid account module 170, a profile stored in the prepaid account storage 180 at any time.

Upon associating the prepaid card 210 with a profile stored on the prepaid account storage 180, the user 220 can make purchases or otherwise debit against the prepaid card 210 for any service or product. In particular, the user 220 presents the prepaid card 210 to the prepaid transaction interface 200. For example, the prepaid card 210 can have a magnetic strip and the prepaid transaction interface 220 a magnetic strip reader. Likewise, the prepaid card 210 can have a bar code or other optically detectable insignia that is read by the prepaid transaction interface 210 or, in general, any other type of known or later developed electrical, electromechanical, inductive, capacitive, optical or hybrid based system that is capable of reading information associated with the prepaid card 210.

Upon presenting the prepaid card 210 to the prepaid transaction interface 200, the prepaid transaction interface 200 reads information associated with the prepaid card 210 that allows for the transaction to be processed. At some point during the transaction process, the prepaid account module 170, via the network 10 and one or more links 5, receives information that a transaction has been requested by the prepaid transaction interface 200. At this point, the prepaid account module 170 reconciles information on the sensed prepaid card 210 with one or more profiles and notifies the prepaid transaction tracking module 100 that information regarding the transaction should be recorded.

The prepaid tracking module 100, in cooperation with the controller 110, the memory 120, the I/O interface 130 and the data collection module 140 then collects various information about the transaction requested at the prepaid transaction interface 200. For example, the data collection module 140 can collect such information as time, date, amount, purchased product or service, balance remaining on the card, or the like. For example, the profile stored in the prepaid account storage 180 can specify to the data collection module 140 what type of information is to be collected, for example, based on the type of transaction, location, or any other criteria. Upon on the data collection module 140 completing the collection of specific information, the information is forwarded for storage, via the network 10, and the prepaid account module 170, in the prepaid account storage 180.

Then, at any point in time, a user, via the user interface 230 which can be, for example, a personal computer, a web interface, a PDA, a dedicated prepaid transaction tracking report system, or in general any device capable of communicating with the prepaid transaction tracking system, can generate reports of the information associated with one or more profiles on the prepaid account storage 180. In particular, a user, via user interface 230, accesses, with the cooperation of the access module 110, via, for example, a login ID and a password, the report module 150. The report module 150 allows a user at user interface 230 to select one or more predetermined reports or create a new report to display information associated with one or more profiles on the prepaid account storage 180. For example, a user at user interface 230 selects one or more reports at the report module 150 which, in cooperation with the prepaid account module 170 and the prepaid account storage 180, collects the information represented in the report and forwards the report, via links 5 and the network 10, to the user interface 230. The user at user interface 230 can then, for example, output the report to a printer 240, or other comparable output means such as web page, e-mail, pdf document, spreadsheet, accounting program, or the like. In this way, an entity is at least able to, for example, track transactions that are performed with one or more prepaid cards 210.

FIG. 2 illustrates an exemplary profile 185 that can be used with the systems and methods of this invention. In particular, this exemplary profile 185 specifies the types of information that are to be tracked for "travel," "dining" and "telephone" expenses. In addition, there are blanks in which, for example, a user can insert additional information about the transaction. Furthermore, the prepaid transaction tracking system can be dynamic and interact with the transaction interface to allow, for example, the profile of items that are to be tracked displayed at, for example, the credit card processing terminal. The user could then be shown the information that is specified to be tracked by the transaction tracking system and select/deselect, for example via a graphical user interface having a checkbox (not shown), the information that is to be tracked or specify additional information that should be associated with the transaction and/or stored in the profile. Alternatively, the user could specify certain information that should not be associated with the transaction.

Figure 3:
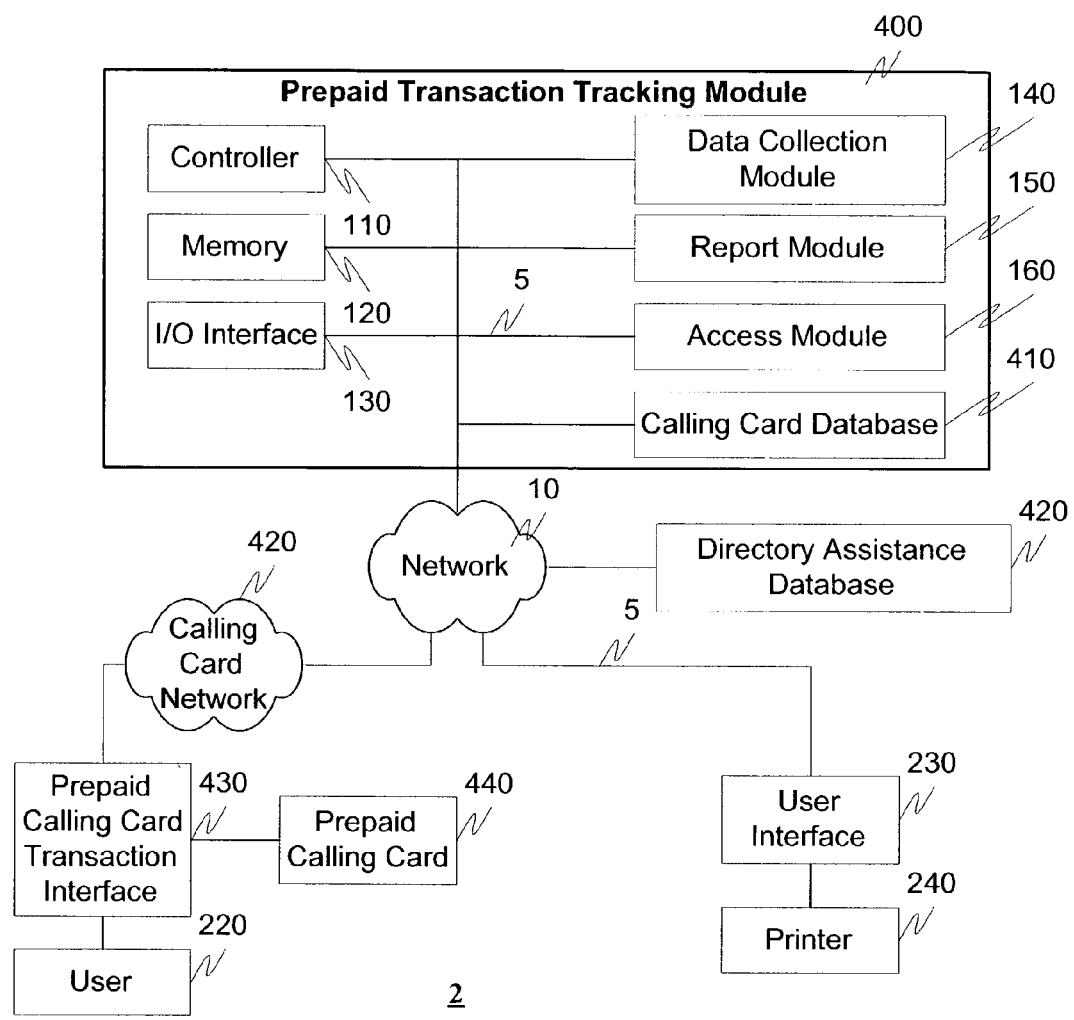
FIG. 3 is a functional block diagram illustrating a second exemplary embodiment of a prepaid transaction system according to this invention.

FIG. 3 illustrates a second exemplary embodiment of prepaid transaction tracking system 2. In particular, the prepaid transaction tracking system 2 comprises a prepaid transaction tracking module 400, a calling card network 420, a prepaid calling card transaction interface 430, one or more users 220, a prepaid calling card 440, a user interface 230, a printer 240 and a directory assistance, calling name (CNAM) or line information (LIDB) database 420, all interconnected by links 5 and network 10.

The prepaid transaction module 400 comprises a controller 110, a memory 120, an I/O interface 130, a data collection module 140, a report module 150, an access module 160 and a calling card data base 410, all interconnected by links 5. For ease of explanation, the function of already discussed elements will be omitted in relation to the discussion of the embodiment illustrated in FIG. 3.

The prepaid transaction tracking system 400 as illustrated in FIG. 3 is directed toward a specific embodiment where the prepaid card is a prepaid calling card 440 that is used to pay for telecommunication services, such as a calls, toll calls, Internet access, video conferencing, or the like.

In operation, a user 220 introduces the prepaid calling card 440 into the sensible area of the prepaid calling card transaction interface 430. As discussed in relation to the first embodiment, the prepaid calling card interface 430 and prepaid calling card 440 can exchange information based on any known or later developed electrical, electromechanical, optical, inductive, capacitive or hybrid information exchange system. Having sensed, for example, an identifier on the prepaid calling card 440, information is forwarded to the calling card network 420 for processing of the telecommunications transaction. However, in addition to the processing, billing, routing and call completing of the calling card network 420, the data collection module 140 in cooperation with the calling card database 410, monitors the information associated with the prepaid calling card 440.

Specifically, the prepaid transaction module 400, in cooperation with the data collection module 140 and the calling card database 410, can determine if the prepaid calling card 440 is associated with a profile stored in the calling card database 410. Alternatively, if the prepaid calling card 440 is not associated with a profile in the calling card database 410, the prepaid transaction tracking module 400 can query the user 220 to create a profile to enable tracking, recording, and/or selective recording and/or tracking of one or more portions of information associated with a transaction initiated at the prepaid calling card transaction interface 430.

Thus, once the calling card 440 is associated with at least one profile, at any time during the telecommunications action initiated at the prepaid calling card transaction interface 430, the data collection module 140, via links 5 and network 10 and in cooperation with the controller 110, the memory 120, and the I/O interface 130, collects one or more portions of information about the transaction, such as call. Furthermore, and in cooperation with the directory assistance, calling name (CNAM) or line information (LIDB) database 420, the data collection module 140 can access supplemental information including, for example, the name and address of the called party, the location of the calling party, or any other information deemed relevant and/or specified in the profile stored in calling card database 410.

Then, as with the previously discussed embodiment, a user, via a user interface 230, can access, with the cooperation of the access module 160, one or more reports in the report module 150. These reports can be output via links 5 and network 10, on, for example, the printer 240, a web page, e-mail, or the like, as discussed above.

Alternatively, the prepaid card 210 or the prepaid calling card 440 can be populated with memory that allows the card to store the information about one or more transactions the card is used in. Then, for example, upon taking and presenting the card at predetermined location, the information could be downloaded and stored, for example, in a prepaid account storage 180, or alternatively, reports generated directly from the information stored on the card.

Figure 4:
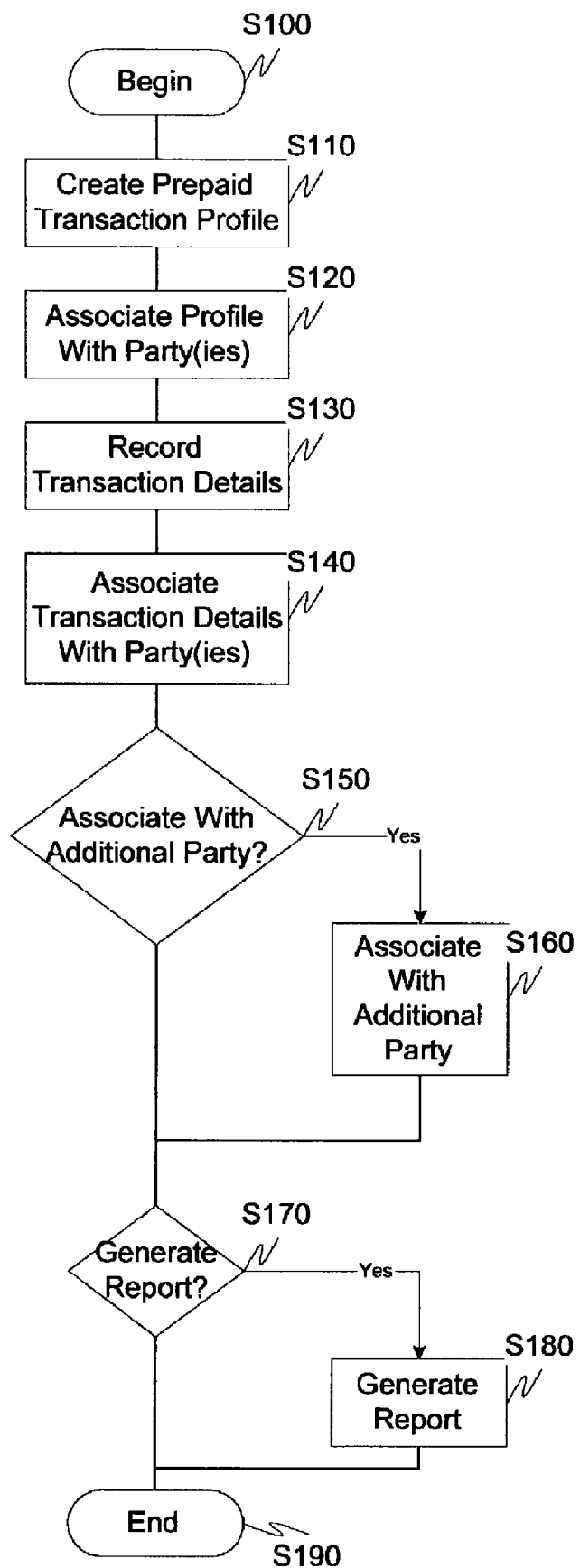
FIG. 4 is a flowchart illustrating an exemplary method of tracking transactions according to this invention.

FIG. 4 illustrates a first exemplary method of prepaid transaction tracking according to this invention. In particular, control begins in step S100 and continues to step S110. In step S110, a prepaid transaction profile is created. Next, in step S120, the profile is associated with one or more prepaid cards. Then, in step S130, upon a transaction being initiated, details regarding the transaction are recorded. Control then continues to step S140.

In step S140, the details associated with the transaction are associated with the appropriate profile. Next, in step S150, a determination is made as to whether the transaction details should be associated with one or more other profiles. For example, the user can be queried to select which one or more profiles the transaction details should be associated with. If the transaction details are to be associated with additional profiles, control continues to step S160 where the transaction information is associated with one or more additional profiles. Otherwise, control jumps to step S170.

In step S170, a user access the prepaid transaction tracking system and a determination is made as to whether they would like to produce a report. If a report is desired, control continues to step S180 where a report is generated and output. Otherwise, control jumps to step S190 where the control sequence ends.

Figure 5:
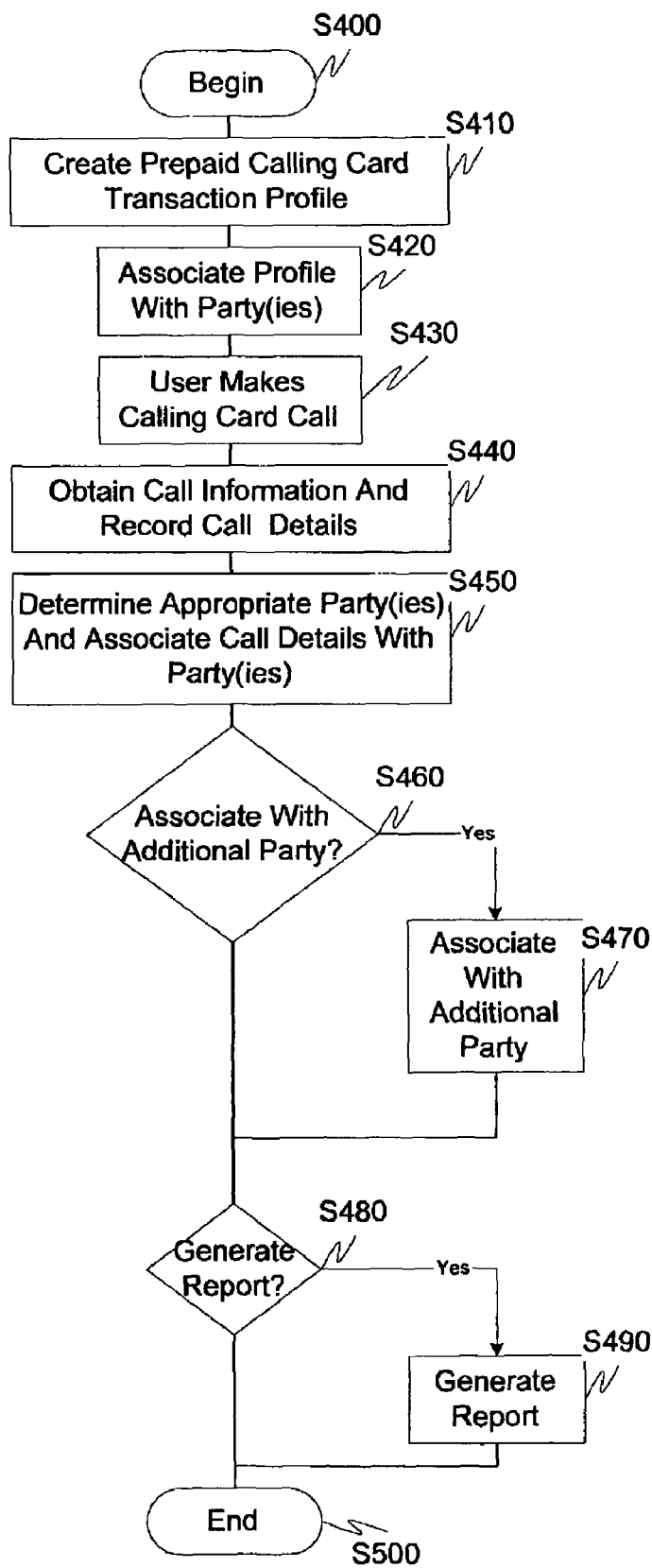
FIG. 5 is a flowchart illustrating a second exemplary embodiment of a method for attracting transactions according to this invention.

FIG. 5 illustrates a second exemplary method of prepaid transaction tracking according to this invention. In particular, control begins in step S400 and continues to step S410. In step S410, a prepaid transaction profile is created. Next, in step S420, the profile is associated with one or more prepaid calling cards. Then, in step S430, a user initiates a call using the prepaid calling card. Control then continues to step S440.

In step S440, information about the call is tracked and recorded. Next, in step S450, the appropriate profiles are determined and the information associated with the call stored with the profile. Then, in step S460, a determination is made as to whether one or more additional profiles should also be associated with information about the call. If additional profiles are to be associated with information about the call, control continues to step S470 where the call information is associated with the one or more selected profiles. Otherwise, control jumps to step S480.

In step S480, a determination is made as to whether one or more reports based on one or more profiles are desired. If one or more reports are desired, control continues to step S490 where the reports are generated. Otherwise, control jumps to step S500 where the control sequence ends.

As illustrated in the figures, the prepaid transaction tracking system can be implemented either on a single programmed general purpose computer, a separately programmed general purpose computer, or a combination thereof. However, the prepaid transaction tracking system can also be implemented on a special purpose computer, a programmed microprocessor or microcontroller and peripheral integrated circuit elements, an ASIC, or other integrated circuit, a digital signal processor, a hard-wired electronic or logic circuit such as a discrete element circuit, a programmable logic device, such as PLD, PLA, FPGA, PAL, or the like. In general, any device capable of implementing a state machine that is in turn capable of implementing the flowcharts illustrated herein can be use to implement the prepaid transaction tracking system according to this invention.

Furthermore, the disclosed methods may be readily implemented in software using object or object-oriented software development environments that provide source code that can be use on a variety of computer, server, and/or workstation hardware platforms. Alternatively, the prepaid transaction tracking system may be implemented partially or fully in hardware using standard logic circuits or VSLI design. Whether software or hardware is used to implement the systems in accordance with this invention is dependent on the speed and/or efficiency requirements of the system, the particular function, and the particular software or hardware systems or microprocessor or microcomputer and telecommunications systems being utilized. A prepaid transaction tracking system however, can be readily implemented in hardware and/or software using any known or later developed systems or structures, devices, and/or software by those of ordinary skill in the applicable arts from the function description provided herein, and with a general basic knowledge of the computer and telecommunications arts. Moreover, the disclosed methods may be readily implemented as software executed on a programmed general purpose computer, a special purpose computer, a microprocessor, or the like. In these instances, the methods and systems of this invention can be implemented as a program embedded in a telecommunications and/or computer system such as a Java® or CGI script, applet, servlet, as a resource residing on a server or graphic workstation, as a routine embedded on a dedicated prepaid transaction tracking system, or the like. The prepaid transaction tracking system can also be implemented by physically incorporating the system into a software and/or hardware system such as the hardware and software system of a computer and associated interface device.

It is therefore apparent that there has been provided in accordance with the present invention, a prepaid transaction tracking system. While this invention has been described in conjunction with a number of illustrative embodiments, it is evident that many alternatives, modifications, and variations would be or are apparent to those of ordinary skill in the applicable arts. Accordingly, the disclosure is intended to embrace all such alternatives, modifications, equivalents and variations that are within the spirit and scope of this invention.

What is claimed:

1. A prepaid transaction tracking system comprising:
a transaction tracking module, implemented by a processor of a computer, that receives a unique identifier associated with a prepaid calling card;
a data collection module, implemented by the processor, that selectively collects information associated with one or more transactions associated with the prepaid calling card based upon a profile, the profile specifying a first type of information to be collected by the data collection module when the prepaid calling card is associated with a first transaction of the one or more transactions and a second type of information to be collected by the data collection module when the prepaid calling card is associated with a second transaction of the one or more transactions; and
a storage device that stores the collected information.

2. The system of claim 1, further comprising a transaction interface that at least receives the information associated with the one or more transactions made with the prepaid calling card.

3. The system of claim 1, further comprising an access module that allows a user to access the information associated with the one or more transactions stored in the storage device.

4. The system of claim 1, further comprising a calling card database that stores the unique identifier associated with the prepaid calling card.

5. The system of claim 1, further comprising a report module that assembles the selected transaction information associated with the one or more transactions to create a report.

6. The system of claim 1, wherein the data collection module communicates with one or more other systems to obtain the information associated with the one or more transactions.

7. The system of claim 1, wherein the information associated with the one or more transactions is associated with multiple profiles.

8. The system of claim 1, where the data collection module further employs directory assistance to collect additional information associated with the one or more transactions.

9. The system of claim 8, where the additional information includes a name of a called party and an address of the called party.

10. A method, performed by a computer, for prepaid transaction tracking, the method comprising:
selectively collecting, by a processor of the computer, information associated with one or more transactions associated with a prepaid calling card based upon a profile, the profile specifying a first type of information to be collected when the prepaid calling card is associated with a first transaction of the one or more transactions and specifying a second type of information to be collected when the prepaid calling card is associated with a second transaction of the one or more transactions; and storing, by a storage device of the computer, the collected information.

11. The method of claim 10, further comprising receiving the information associated with the one or more transactions made with the prepaid calling card.

12. The method of claim 10, further comprising allowing a user to access the collected information associated with the one or more transactions stored in the storage device.

13. The method of claim 10, further comprising storing a unique identifier associated with the prepaid calling card.

14. The method of claim 10, further comprising assembling the collected transaction information associated with the one or more transactions to create a report.

15. The method of claim 10, where the selectively collecting includes:

communicating with one or more other systems to obtain the information associated with the one or more transactions.

16. The method of claim 10, where the information associated with the one or more transactions is associated with multiple profiles.

17. The method of claim 10, where the selectively collecting employs directory assistance to collect additional information associated with the one or more transactions.

18. The method of claim 17, where the additional information includes a name of a called party and an address of the called party.

19. A prepaid transaction tracking system comprising:

means for selectively collecting information associated with one or more transactions associated with a prepaid calling card based upon a profile, the profile specifying a first type of information to be collected when the prepaid calling card is associated with a first transaction of the one or more transactions and specifying a second type of information to be collected when the prepaid calling card is associated with a second transaction of the one or more transactions; and means for storing the collected information.

20. The system of claim 19, where the means for selectively collecting employs directory assistance to collect additional information associated with the one or more transactions.

21. The system of claim 20, where the additional information includes a name of a called party and an address of the called party.

22. A method, performed by a computer, for collecting information for a prepaid card that is associated with one or more transactions, the method comprising:

identifying, by a processor of the computer, a profile for the one or more transactions, the profile identifying a first type of information to be collected for the prepaid card for a first transaction of the one or more transactions and identifying a second type of information to be collected for the prepaid card for a second transaction of the one or more transactions; and collecting, by the processor, information associated with the one or more transactions based on the identified profile.

23. The method of claim 22, where the prepaid card includes a prepaid calling card, and where the profile specifies that one or more of a name of a called party, an address of a called party, or a location of the calling party is to be collected.

* * * * *